United States Patent
Stopper et al.

[11] Patent Number: 6,156,421
[45] Date of Patent: Dec. 5, 2000

[54] STRETCHED-FILLED MICROPOROUS FILMS AND METHODS OF MAKING THE SAME

[75] Inventors: Steven Ray Stopper, Duluth; Robin Lee Jacobs, Woodstock, both of Ga.

[73] Assignee: Kimberly-Clark Worldwide, Inc., Neenah, Wis.

[21] Appl. No.: 09/037,345

[22] Filed: Mar. 10, 1998

Related U.S. Application Data

[60] Provisional application No. 60/041,888, Apr. 2, 1997.

[51] Int. Cl.[7] ................ B32B 3/00; B32B 3/26
[52] U.S. Cl. ................ 428/315.5; 428/317.9; 428/315.9
[58] Field of Search ............ 428/315.5, 317.9, 428/315.9

[56] References Cited

U.S. PATENT DOCUMENTS

| | | |
|---|---|---|
| 3,338,992 | 8/1967 | Kinney . |
| 3,341,394 | 9/1967 | Kinney . |
| 3,418,045 | 12/1968 | Rovsek . |
| 3,502,763 | 3/1970 | Hartmann ................ 264/210 |
| 3,542,615 | 11/1970 | Dobo et al. ............ 156/181 |
| 3,692,618 | 9/1972 | Dorschner et al. ......... 161/72 |
| 3,802,817 | 4/1974 | Matsuki et al. .......... 425/66 |
| 3,849,241 | 11/1974 | Butin et al. ............ 161/169 |
| 3,855,046 | 12/1974 | Hansen et al. .......... 161/150 |
| 3,947,473 | 3/1976 | Scott et al. ............ 260/345.5 |
| 4,041,203 | 8/1977 | Brock et al. ............ 428/157 |
| 4,340,563 | 7/1982 | Appel et al. ............ 264/518 |
| 4,341,880 | 7/1982 | Toyoda et al. .......... 524/101 |
| 4,374,258 | 2/1983 | Horner et al. .......... 549/407 |
| 4,374,888 | 2/1983 | Bornslaeger ............ 428/198 |
| 4,404,304 | 9/1983 | Horner et al. .......... 524/110 |
| 4,511,685 | 4/1985 | Nissen et al. .......... 524/110 |
| 4,680,327 | 7/1987 | Hettche et al. .......... 524/110 |
| 4,777,073 | 10/1988 | Sheth .................. 428/155 |
| 4,789,699 | 12/1988 | Kieffer et al. .......... 524/271 |
| 4,806,580 | 2/1989 | Bock et al. ............ 524/110 |
| 5,063,264 | 11/1991 | Nakajima .............. 524/118 |
| 5,143,763 | 9/1992 | Yamada et al. .......... 428/36.2 |
| 5,145,727 | 9/1992 | Potts et al. ............ 428/198 |
| 5,159,027 | 10/1992 | Kanayama et al. ........ 525/391 |
| 5,169,706 | 12/1992 | Collier, IV et al. ...... 428/152 |

(List continued on next page.)

FOREIGN PATENT DOCUMENTS

| | | |
|---|---|---|
| 0407198 | 9/1991 | European Pat. Off. . |
| 0691203 | 1/1996 | European Pat. Off. . |
| 851670 | 4/1959 | United Kingdom . |
| 1565745 | 4/1980 | United Kingdom . |
| 2257146A | 1/1993 | United Kingdom . |
| 94/25657 | 11/1994 | WIPO . |
| 95/16262 | 6/1995 | WIPO . |
| 95/19391 | 7/1995 | WIPO . |
| 96/19346 | 6/1996 | WIPO . |
| 96/19349 | 6/1996 | WIPO . |

OTHER PUBLICATIONS

Japan Patent Abstract 54–114551, Sep. 6, 1979.
Japan Patent Abstract 55–005337A, Jan. 16, 1980.
Ronotec®, Vitamin E Supplement, Issue Two.
Ronotec®, Ronotec Dry Free–Flowing, Low–Dusting, Solid Vitamin E Antioxidant.
Plastics Technology, Newsfocus, Ciba Takes Lead In Developing Vitamin E Antioxidants, Dec. 1996.
Hoffmann–La Roche, Inc., Vitamin E Antioxidants, The Perfect Prescription for Plastics.

(List continued on next page.)

*Primary Examiner*—Terrel Morris
*Assistant Examiner*—Norca L. Torres
*Attorney, Agent, or Firm*—Douglas H. Tulley, Jr.

[57] ABSTRACT

A breathable microporous film is prepared by extruding a film comprising about 30 to 70% by weight of a thermoplastic polymer, about 30 to 70% by weight of filler particles having an average particle size less than about 10 microns and about 100 to 1000 PPM of a mono-functional hindered phenol, such as α-tocopherol, and then sufficiently stretching the filled film in at least one direction thereby creating a fine pore network therein and a water vapor transmission rate in excess of 300 g/m$^2$/24 hours.

9 Claims, 1 Drawing Sheet

U.S. PATENT DOCUMENTS

| | | | |
|---|---|---|---|
| 5,169,712 | 12/1992 | Tapp | 428/315.5 |
| 5,178,931 | 1/1993 | Perkins et al. | 428/198 |
| 5,188,885 | 2/1993 | Timmons et al. | 428/198 |
| 5,200,433 | 4/1993 | Hudson | 524/99 |
| 5,200,443 | 4/1993 | Hudson | 524/99 |
| 5,218,008 | 6/1993 | Parrish | 521/114 |
| 5,234,750 | 8/1993 | Akao | 428/219 |
| 5,236,963 | 8/1993 | Jacoby et al. | 521/92 |
| 5,258,422 | 11/1993 | Chang et al. | 523/124 |
| 5,270,430 | 12/1993 | Parrish | 528/49 |
| 5,300,257 | 4/1994 | Akashi et al. | 252/400 |
| 5,308,549 | 5/1994 | Laermer et al. | 252/399 |
| 5,418,045 | 5/1995 | Pike et al. | 427/198 |
| 5,426,141 | 6/1995 | Akao | 524/110 |
| 5,457,216 | 10/1995 | Kleinknecht | 549/408 |
| 5,496,877 | 3/1996 | Aumueller et al. | 524/246 |
| 5,695,868 | 12/1997 | McCormack | 428/283 |
| 5,914,184 | 6/1999 | Morman | 428/315.9 |
| 5,993,589 | 11/1999 | Morman | 156/229 |
| 6,045,900 | 4/2000 | Haffner et al. | 428/315.9 |
| 6,072,005 | 6/2000 | Kobylivker et al. | 525/240 |

OTHER PUBLICATIONS

Ciba Specialty Chemicals, Inc., Iranox® E217DF, Jan. 1998.

Ciba Specialty Chemicals, Inc., product data sheets.

Ciba–Geigy Corporation, Antioxidants, 1995.

Lewis, Richard J., Sr., Condensed Chemical Dictionary, Twelfth Edition, tocopherol definition.

Federal Test Method Standard No. 191A, Weight of Textile Materials, Small Specimen Method, Method 5041, Jul. 20, 1978.

Federal Test Method Standard No. 191A, Water Resistance of Cloth; Low Range, Hydrostatic Pressure Method, Method 5514, Jul. 20, 1978.

Federal Test Method Standard No. 191A, Water Resistance of Cloth; Water Permeability, Hydrostatic Pressure Method, Method 5516, Jul. 20, 1978.

U.S. Statutory Invention Registration H1600, Oct. 1, 1996 to Imfeld et al.

Japan Patent Abstract 02–102241, Jul. 3, 1990.

Japan Patent Abstract 60–72980, Aug. 22, 1985.

Japan Patent Abstract 61–42303, Jul. 11, 1986.

Japan Patent Abstract 62–158737, Dec. 25, 1987.

Japan Patent Abstract 62–86036, Sep. 18, 1987.

Japan Patent Abstract 63–137941, Oct. 18, 1988.

Japan Patent Abstract JO 3043–458A, Feb. 25, 1991.

Japan Patent Abstract JO 3043–459A, Feb. 25, 1991.

Japan Patent Abstract JO 3296–562A, Dec. 27, 1991.

Japan Patent Abstract J5 4034–352, Mar. 13, 1979.

Japan Patent Abstract J5 6028–229, Mar. 19, 1981.

Japan Patent Abstract J5 8096–638A, Jun. 8, 1983.

Japan Patent Abstract J5 4020–056, Feb 15, 1979.

Japan Patent Abstract J6 2156–151A, Jul. 11, 1987.

U.S. Application No. 756,426, Nov. 26, 1996.

U.S. Application No. 775,087, Dec. 30, 1996.

STRETCHED-FILLED MICROPOROUS FILMS AND METHODS OF MAKING THE SAME

This application claim benefit to provisional Application 60/041,888 and Filing date Apr. 2, 1997.

FIELD OF THE INVENTION

The present invention relates to stretched-filled films. More particularly, the present invention relates to improved stretched-filled microporous films.

BACKGROUND OF THE INVENTION

There exist a variety of fabrics today which are capable of acting as a barrier to particulate matter, water and other liquids yet which allow water vapor and air to pass therethrough. Such fabrics are commonly referred to as "breathable barriers." Breathable barrier fabrics have been employed in outdoor fabrics, tarpaulins, garments, personal care products, infection control products, as well as numerous other articles. Moreover breathable barrier fabrics are often preferred over non-breathable barrier materials since breathable barrier fabrics allow moisture trapped beneath the fabric to escape as water vapor. Thus, apparel using breathable barriers are generally more comfortable to wear since the migration of water vapor through the fabric helps to reduce and/or eliminate discomfort resulting from excess moisture trapped against the skin.

While a variety of breathable barrier fabrics are known in the art, one particularly useful breathable barrier comprises stretched-filled microporous films. Such films are typically filled with particles and then crushed or stretched to form a fine pore network throughout the film. The fine pore network allows gas and water vapor to pass through the film while acting as a barrier to liquids or particulate matter. The amount and size of filler within the film and the degree of stretching is controlled so as to create a network of micropores which are of a size and frequency to impart the desired level of breathability to the fabric. For example, U.S. Pat. No. 4,777,073 issued to Sheth discloses a breathable polyolefin film filled with about 15 to 35% by volume calcium carbonate and stretched to about four times its original length. Similarly, U.S. Pat. No. 5,169,712 issued to Tapp discloses an oriented porous film comprising ethylene-propylene block copolymers filled with a nucleating agent and calcium carbonate which may be stretched up to about seven times its original length in order to create a breathable microporous film.

While filled microporous films are capable of providing articles with good barrier properties and breathability, efficient commercialization and practical applications of such films requires improved stretch, strength and toleration of defects. In this regard, stretching or down-gauging of filled films often makes them particularly susceptible to irregularities such as, for example, pinholes, gels larger than the film thickness, particulate contamination and/or uneven polymer distribution. While not detracting from film breathability, the barrier properties of stretched-filled films may be compromised since these irregularities tend to create defects (i.e. macroscopic holes) or zones of weakness in the film. This is of enormous concern where the film is intended to act as a barrier to urine, blood or other bodily fluids and pathogens associated therewith. Moreover, stretching of the filled films to the required degree, while acting to orient the film and also make the film microporous, has the adverse effect of reducing the strength and elongation of the resulting breathable film. In light of the many uses of such films, particularly in garments or infection control products, a breathable barrier fabric with improved durability is highly desirable since films of lesser strength will tend to tear more readily and also be more restrictive to movement.

Thus, there exists a need for improved filled microporous films and particularly such films having improved strength and stretch characteristics. Moreover, there exists a need for filled films which have reduced levels of and/or which are more tolerant of these irregularities when stretched. Further, there exists a need for a method of making such stretched-filled films and, in particular, a method of making a breathable film which improves the physical characteristics of the resulting film and/or reduces the potential for film defects.

SUMMARY OF THE INVENTION

The aforesaid needs are fulfilled and problems experienced by those skilled in the art overcome by the stretched-filled film of the present invention which comprises (i) from about 30 to 70% by weight of a thermoplastic polymer, (ii) from about 30 to 70% by weight of filler particles having an average particle size less than about 10 microns and (iii) from about 100 to 1500 PPM of a mono-functional hindered phenol wherein the stretched-filled film is a breathable barrier. In a further aspect, the hindered phenol desirably comprises a tocopherol such as, for example, 2,5,7,8-tetramethyl-2-(4',8',12'-trimethyltridecyl)-6-chromanol. In a preferred embodiment, a mono-functional hindered phenol, such as an alpha-tocopherol may be present within the film in an amount from about 100 to 600 ppm.

In a further aspect of the present invention, breathable barriers of stretched thinned films may be made in accord with the present invention by the steps of forming a film extrudate comprising about 30 to 70% by weight of a thermoplastic polymer, about 30 to 70% by weight of filler particles having an average particle size less than about 10 microns and about 100 to 1000 PPM of a mono-functional hindered phenol. A film is then formed from the extrudate and then sufficiently stretched in at least one direction to impart breathability to the film. The film is desirably stretched between 50 to 90% of elongation to break thereby forming a breathable barrier film having a WVTR in excess of about 300 g/m$^2$/24 hours. In a further aspect the film may be uniaxially stretched in the machine direction to a degree sufficient to give the stretched-filled film a WVTR of at least 1500 g/m$^2$/24 hours.

DEFINITIONS

Figure 1:
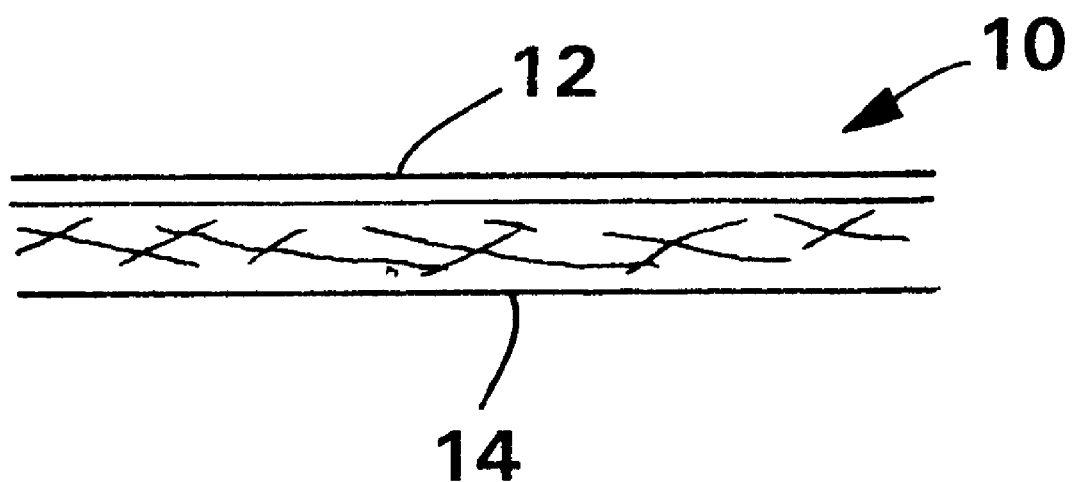
FIG. 1 is a cross-sectional view of a stretched-filled film/nonwoven laminate of the present invention.

As used herein the term "nonwoven" fabric or web means a web having a structure of individual fibers or threads which are interlaid, but not in an identifiable manner as in a knitted fabric. Nonwoven fabrics or webs have been formed by many processes such as for example, meltblowing processes, spunbonding processes, and bonded carded web processes.

As used herein the term "spunbonded fibers" refers to small diameter fibers of oriented polymeric material. Spunbond fibers may be formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,418,045 to Pike et al. Spunbond fibers are generally not tacky when they are deposited onto a collecting surface and are generally continuous. Fine fiber spunbond webs, such as may be achieved with splittable fibers as described in co-assigned U.S. patent application Ser. No. 08/756,426, are likewise included within this term.

As used herein the term "meltblown fibers" means microfibers of less oriented polymeric material (relative to spunbond fibers) and may be formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which are predominantly microfibers. Thereafter, the meltblown fibers can be carried by the high velocity gas stream and are deposited on a collecting surface to form a web of randomly dispersed meltblown fibers. Such a process is disclosed, for example, in U.S. Pat. No. 3,849,241 to Butin et al., the entire contents of which are hereby incorporated herein by reference. Meltblown fibers are microfibers which may be continuous or discontinuous, are generally smaller than 10 microns in average diameter, and are generally tacky when deposited onto a collecting surface.

As used herein "multilayer laminate" means a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier et al., U.S. Pat. No. 5,145,727 to Potts et al., U.S. Pat. No. 5,178,931 to Perkins et al. and U.S. Pat. No. 5,188,885 to Timmons et al., the entire contents of the aforesaid patents are incorporated herein by reference. Such a laminate may be made by sequentially depositing onto a moving forming belt first a spunbond fabric layer, then a meltblown fabric layer and last another spunbond layer and then bonding the laminate by thermal point bonding as described below. Alternatively, the fabric layers may be made individually, collected in rolls, and combined in a separate bonding step.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, "ultrasonic bonding" means a process performed, for example, by passing the fabric between a sonic horn and anvil roll as illustrated in U.S. Pat. No. 4,374,888 to Bornslaeger.

As used herein "point bonding" means bonding one or more layers of a laminate at a plurality of discrete, spaced apart areas. As a particular example, "thermal point bonding" can comprise passing one or more layers of a laminate to be bonded between a heated engraved pattern roll and a smooth calender roll. The engraved roll is patterned in some way so that the entire fabric is not bonded over its entire surface and the anvil roll is usually flat. As a result, various patterns for calender rolls have been developed for functional as well as aesthetic reasons. One example of a pattern has points and is the Hansen Pennings or "H&P" pattern with about a 30% bond area when new and with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5% when new. Another typical point bonding pattern is the expanded Hansen Pennings or "EHP" bond pattern which produces a 15% bond area when new with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15% when new. Ramisch bond patterns, comprising a repeating pattern of spaced diamonds, are a further example of existing bond patterns. Yet another common pattern is the C-Star pattern which has, when new, a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern which has a pattern resembling that of a window screen, with about a 15% bond area. Typically, the percent bonding area varies from around 5% to around 35% of the area of the fabric laminate web and a pin density from about 40 to about 400 pins per square inch. As is known in the art, the spot bonding holds the laminate layers together as well as imparts integrity to each individual layer by bonding filaments and/or fibers within each layer.

As used herein, the term "blood barrier" means a fabric which is relatively impermeable to the transmission of blood, i.e., a fabric that passes the blood strike-through test as described in ASTM Test F 1670-97. In addition to resistance to penetration by blood, the films and/or laminates of the present invention may further be required to act as barriers to bacteria, viruses and other like organisms.

As used herein, the term "pathogen barrier" means a fabric which is relatively impermeable to the transmission of pathogens, i.e., a fabric that passes the blood borne pathogen penetration test as described in ASTM Test F 1670-97a.

Hydrohead as used herein refers to a measure of the liquid barrier properties of a fabric measured in millibars (mbar) as described herein below. Microporous films of the present invention can have a hydrohead in excess of 50 mbar and, depending on the needs of the particular application, can have a hydrohead value greater than about 80 mbar, 150 mbar or even 200 mbar.

As used herein, the term "breathable" refers to a material which is permeable to water vapor having a minimum WVTR of at least about 300 g/m$^2$/24 hours. The WVTR of a fabric is water vapor transmission rate which, in one aspect, gives an indication of how comfortable a fabric would be to wear. WVTR is reported in grams/square meter/day and can be measured as described herein below.

As used herein the term "basis weight" refers to the mass of a film or other material per unit area, such as in grams per square meters (g/m$^2$).

As used herein, the term "garment" means any type of non-medically oriented apparel which may be worn. This includes industrial work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

As used herein, the term "protective cover" means a tarpaulin or cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

DESCRIPTION OF THE INVENTION

Referring to FIG. 1, there is shown a stretched-filled film/nonwoven laminate 10 according to the present invention including a first film layer 12 and a first nonwoven web support layer 14. The laminate can contain additional film and/or support layers such as, for example, comprising a spunbond/film laminate, spunbond/film/spunbond laminate, spunbond/film/film/spunbond, meltblown/film/spunbond laminate etc.

The film layer 12 can be made from any thermoplastic film which can be stretched in at least one direction, thereby reducing the film gauge or thickness. Suitable film materials include at least three components: a thermoplastic polyolefin polymer, a filler and a mono-functional hindered phenol stabilizer. These (and other) components can be mixed together, heated and then extruded into a mono-layer or multi-layer film. The film may be made by any one of a variety of film forming processes known in the art such as, for example, by using either cast or blown film equipment. Preferably, the film is a flat cast or chill cast film. Methods of making stretched-filled films are described in U.S. Pat. No. 4,777,073 to Sheth; U.S. Pat. No. 5,695,868 to McCormack; U.S. patent application Ser. No. 08/929,562; U.S. patent application Ser. No. 08/854,460 to Stopper et al.; and European Patent Application Publication WO 96/19346; the entire content of the aforesaid references are incorporated herein by reference.

Thermoplastic polymers used in the fabrication of the films of the present invention include, but are not limited to, polyolefins including homopolymers, copolymers and blends thereof. As an example, "polyolefin based" films may also be suitable for use in the present invention. For purposes of the present invention a film is considered to be "polyolefin-based" if the polymeric portion of the film, exclusive of any filler materials, has at least 50 weight percent polyolefin based upon the total weight of polymer in the film. Additional film forming polymers which may be suitable for use with the present invention, alone or in combination with other polymers, include ethylene vinyl acetate (EVA), ethylene ethyl acrylate (EEA), ethylene acrylic acid (EAA), ethylene methyl acrylate (EMA), ethylene normal butyl acrylate (EnBA), polyester (PET), nylon, ethylene vinyl alcohol (EVOH), polystyrene (PS), polyurethane (PU), polybutylene (PB), and polybutylene terephthalate (PBT). However, predominantly linear polymers are preferred such as, for example, polymers of ethylene, propylene, 1-butene, 4-methyl-pentene, 1-hexene, 1-octene and the like as well as copolymers and blends thereof. Further, suitable polymers may include olefinic polymers which are multi-step reactor products wherein an amorphous ethylene propylene random copolymer is molecularly dispersed in a predominantly semicrystalline high polypropylene monomer/low ethylene monomer continuous matrix. In a preferred embodiment polymers of ethylene and/or propylene are employed within the films; examples include, but are not limited to, linear low density polyethylene (LLDPE), high density polyethylene (HDPE), polyolefin plastomers and ethylene-propylene elastomer blends.

In addition to the thermoplastic polymer, the film also includes a filler to impart breathability to the film upon stretching. As used herein a "filler" is meant to include particulates and other forms of materials which can be added to the film polymer extrusion blend and which will not chemically interfere with or adversely affect the extruded film and further which are capable of being uniformly dispersed throughout the film. Generally the fillers will be in particulate form with average particle sizes in the range of about 0.1 to 10 microns, desirably from about 1 to about 4 microns. As used herein the term "particle size" describes the largest diameter or length of a filler particle. Both organic and inorganic fillers are contemplated for use with the present invention provided they do not interfere with the forming process and/or a subsequent laminating processes. Examples of fillers include calcium carbonate (CaCo$_3$), various clays, silica (SiO$_2$), alumina, barium sulfate, sodium carbonate, talc, magnesium sulfate, titanium dioxide, zeolites, aluminum sulfate, cellulose-type powders, diatomaceous earth, gypsum, magnesium sulfate, magnesium carbonate, barium carbonate, leaolin, mica, carbon, calcium oxide, magnesium oxide, aluminum hydroxide, pulp powder, wood powder, cellulose derivatives, polymeric particles, chitin and chitin derivatives. In one embodiment, the filler particles may be ground calcium carbonate. The filler particles may optionally be coated with a fatty acid, such as behenic or stearic acid, which may facilitate the free flow of the particles (in bulk) and their ease of dispersion into the polymer. The film will usually contain at least 30% filler based upon the total weight of the film layer, more desirably from about 40% to 70% by weight filler.

A filled film with improved characteristics and stretch properties is achieved through addition of a mono-functional hindered phenol which can be added to the base polymer(s) prior to extrusion. In this regard it has unexpectedly and surprisingly been found that mono-functional hindered phenol stabilizers significantly improve the stretch characteristics of filled films such as, for example, improving a filled films tolerance of defects upon stretching to "whitening". As used herein "whitening" of the film refers to the opacity of a film wherein, when starting with a translucent film, the film becomes uniformly opaque as a result of light defraction caused by orientation of the filler particles and the microporous voids formed within the film. The "whitening" point is generally achieved in the range of about 50% to about 90% of the elongation to break.

Hindered phenols refers to a class of stabilizers used in the plastics industry as an antioxidant. Chroman derivatives having an extended carbon chain such as, for example, tocopherols (vitamin-E), including α-tocopherol or 2,5,7,8-tetramethyl-2-(4',8',12'-trimethyltridecyl)-6-chromanol, are preferred for use in the present invention. Suitable tocopherol additives are commercially available from Ciba Specialty Chemicals of Terrytown, N.Y. under the tradenames IRGANOX E 17 (previously available from Hoffman-LaRoche, Inc. of Paramus, N.J. under the name RONOTEC Dry 17) and IRGANOX E217 DF. Other suitable hindered phenols include IRGANOX 1076 available from Ciba Specialty Chemicals of Terrytown, N.Y. IRGANOX 1076 is octodecyl 3,5-di-tert-butyl-4-hydroxyhydrocinnamate. Desirably about 100 to 1000 PPM mono-functional hindered phenol is added to the base polymer(s) prior to extrusion and, more desirably, from about 100 PPM to about 600 PPM (parts per million is in reference to total film weight).

Bonding agents such as tackifiers may also be added to the film extrudate. Bonding agents and/or tackifying resins are discussed in U.S. Pat. No. 4,789,699 to Kieffer et al., the contents of which are incorporated herein by reference in their entirety. The purpose of the bonding agent in the present invention is to permit bonding of the film and nonwoven layers at a lower temperature. Examples of bonding agents include hydrogenated hydrocarbon resins such as REGALREZ series tackifiers available from Hercules, Inc. of Wilmington, Del. REGALREZ tackifiers are highly stable, low molecular weight, nonpolar resins. REGALREZ 3102, 1094 are particular examples of suitable bonding agents for use in conjunction with the present invention. Further examples of suitable bonding agents include the following: ARKON P series resins are which are synthetic tackifying resins made by Arakawa Chemical (U.S.A.), Inc. of Chicago, Ill. from petroleum hydrocarbon resins; ZONATAC resins are tackifiers comprising a terpene hydrocarbon with softening points of about 105° C. made by Arizona Chemical Company of Panama City, Fla.; EASTMAN 1023PL resin is an amorphous polypropylene tackifying agent available from Eastman Chemical Company Longview, Tex.; amorphous polyalphaolefins such as REX-TAC from Huntsman Corporation of Salt Lake City, Utah and VESTOPLAST from Hüls AG of Marl, Germany.

Generally, other examples of bonding agents include, but are not limited to, polyamides, ethylene copolymers such as ethylene vinyl acetate (EVA), ethylene ethyl acrylate (EEA), ethylene acrylic acid (EAA), ethylene methyl acrylate (EMA) and ethylene normal-butyl acrylate (EnBA), wood rosin and its derivatives, hydrocarbon resins, polyterpene resins, atactic polypropylene and amorphous polypropylene. Also included are predominately amorphous ethylene propylene copolymers commonly known as ethylene-propylene rubber (EPR) and a class of materials referred to as toughened polypropylene (TPP) and olefinic thermoplastic polymers where EPR is mechanically dispersed or molecularly dispersed via in-reactor multistage polymerization in polypropylene or polypropylene/polyethylene blends.

It should be understood that the foregoing list of bonding or tackifying agents is illustrative only and not meant to limit the scope of the present invention. Generally the bonding agent will comprise from about 2 to about 20 percent of the total weight of the film. While weight percentages outside the range can be used, at higher percentages the breathability of the film becomes compromised which, for garments or personal care articles, is generally not desirable.

In addition, other additives which are compatible with the film forming process, strecthing and any subsequent lamination steps may also be employed with the present invention. For example, additional additives may be added to impart desired characteristics to the film such as, for example, melt stabilizers, processing stabilizers, heat stabilizers, light stabilizers, heat aging stabilizers and other additives known to those skilled in the art. Generally, phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers whereas hindered amine stabilizers (e.g. CHIMASSORB available from Ciba Specialty Chemicals of Terrytown, N.Y.) are exemplary heat and light stabilizers.

As mentioned above, films may be formed using processes known to those skilled in the art. The thermoplastic polymer, filler, mono-functional hindered phenol and other optional additives are mixed in the appropriate ratios, as discussed above, heated and then extruded into a film. Generally, once a film is formed it will desirably have a basis weight of less than about 100 grams per square meter. The film may then be stretched, in at least one direction, as is known in the art such as, for example, using a machine direction orientor (MDO). MDO units are commercially available from the Marshall and Williams Company of Providence, Rhode Island and others. An MDO unit has a plurality of stretching rollers which progressively stretch and thin the film in the machine direction. Further, the film may be stretched in a single continuous zone or stretched in multiple distinct zones. Desirably, after stretching and thinning, the stretched-filled film has a basis weight of less than about 50 g/m$^2$ and even more desirably between about 10 g/m$^2$ and about 35 g/m$^2$.

As a result of the stretching and thinning process the film undergoes a change in its opacity. Typically, as formed the film is relatively transparent but after stretching, it becomes uniformly opaque. As indicated the film becomes oriented during the stretching process. In order to impart the desired breathability to the unstretched film, the film is stretched in a direction at least 2 times its original length. Often the unstretched film will be stretched from 2 to about 7 times its original length in order to reach the whitening point and impart the desired level of breathability. However, the degree of stretch required to impart the desired breathability will vary with polymer composition, initial gauge as well as amount and type of filler. Alternatively, the film may be stretched in the cross-machine direction or bi-axially stretched.

The stretched-thinned microporous films of the present invention may be employed in a variety of applications including use in garments, infection control products, personal care products, outdoor fabrics, protective covers and other articles or fabrics having barrier properties. Further, the stretched-thinned microporous films of the present invention can provide a film with excellent barrier properties, for example, the microprous film can have a hydrohead in excess of 80 mbar as well as act as a blood barrier and/or pathogen barrier. Typically the breathable film will be laminated to one or more support layers such as, for example, nonwoven webs, scrims, woven fabrics, foams and other breathable materials. Desired support layers may comprise breathable nonwoven webs of bonded/carded staple fibers, spunbond fibers, meltblown fibers as well as multilayer laminates employing the same. The film and support layers may be laminated by means known to those skilled in the art including, but not limited to, thermal bonding, ultrasonic bonding and adhesive bonding. Desirably thermal bonding is achieved by thermal point bonding using a bond pattern with a total bond area of less than about 35% of the surface area of the fabric, and even more desirably with bond area between about 5 and 25%. Further, as is known in the art, an adhesive may be applied in a non-continuous manner or pattern across the film and/or support layers. Suitable methods of forming the breathable film/support layer(s) laminate are disclosed in U.S. Pat. No. 5,695,868 and commonly-assigned U.S. patent application Ser. Nos. 08/777,365 filed Dec. 27, 1996 and 08/359,986 filed Dec. 20, 1994, the entire contents of which are incorporated herein by reference.

Thus, it has been found that the present filled film has considerable processing advantages and characteristics over other filled films. For example, the extrudate creates less die lip build-up and also results in a film having better polymer distribution (i.e. more uniform CD film gauge). Stretch-filled films often contain irregularities such as polymer gels, particulate contaminants, filler agglomerates and uneven polymer distribution. However, although with many film applications these irregularities are of little concern, potential problems resulting from such irregularities are magnified when the film is down-gauged. Upon stretching, the differences in film gauge and/or other irregularities within the film can cause generally tear shaped regions or "tails" to develop in the MD around either side of the irregularity. The tails increase in severity in proportion with the degree of stretching and often result in extremely thin, weak regions or a breach in the film. In this regard it has been found that films of the present invention are more tolerant of irregularities which exist within the films (prior to stretching) and, thus, weak regions and/or breaches within the film are avoided to a greater degree. In addition, due to the improved stretch or flow characteristics from the die, stretched-thinned films also have a more uniform thickness or gauge. Moreover, the extrudate of the present invention has improved melt flow rate stabilization, reduced overall irregularities and lowers temperature induced irregularities which allows higher melt temperatures and thus greater throughput to be achieved. Additionally, the stretched-thinned film properties have higher peak loads and load at elongation, that is to say a generally "tougher" film. Accordingly, the films of the present invention and the methods of making the same offer considerable advantages over existing stretched-filled films.

TESTS

Basis Weight: the basis weights of various materials can be determined in accordance with Federal Test Method No. 191A/5041. Sample size for the sample materials was 15.24×15.24 centimeters and at least three values were obtained for each material and then averaged.

WVTR: The water vapor transmission rate (WVTR) for the sample materials can be calculated in accordance with a modified test ASTM Standard E96-80 as discussed hereinafter. Circular samples measuring three inches in diameter were cut from each of the test materials and a control which was a piece of CELGARD™ 2500 film from Hoechst Celanese Corporation of Sommerville, N.J. CELGARD™ 2500 film is a microporous polypropylene film. Three samples were prepared for each material. The test dish was a number 60-1 Vapometer pan distributed by Thwing-Albert Instrument Company of Philadelphia, Pa. One hundred milliliters of water were poured into each Vapometer pan and individual samples of the test materials and control material were placed across the open tops of the individual pans. Screw-on flanges were tightened to form a seal along the edges of the pan, leaving the associated test material or control material exposed to the ambient atmosphere over a 6.5 centimeter diameter circle having an exposed area of approximately 33.17 square centimeters. The pans were placed in a forced air oven at 100° F. (32° C.) or 1 hour to equilibrate. The oven was a constant temperature oven with external air circulating through it to prevent water vapor accumulation inside. A suitable forced air oven is, for example, a Blue M Power-O-Matic 60 oven distributed by Blue M. Electric Company of Blue Island, Ill. Upon completion of the equilibration, the pans were removed from the oven, weighed an immediately returned to the oven. After 24 hours, the pans were removed from the oven and weighed again. The preliminary test water vapor transmission rate values were calculated with Equation (I) below:

$$\text{Test } WVTR = (\text{grams weight loss over 24 hours}) \times 315.5 \text{ g/m}^2/24 \text{ hours} \qquad (I)$$

The relative humidity within the oven was not specifically controlled. Under the predetermined set conditions of 100° F. (32° C.) and ambient relative humidity, the WVTR for the CELGARD™ 2500 control has been defined to be 5000 grams per square meter for 24 hours. Accordingly, the control sample was run with each test and the preliminary test values were corrected to set conditions using Equation (II) below:

$$WVTR = (\text{Test } WVTR/\text{control } WVTR) \times (5000 \text{ g/m}^2/24 \text{ hours}) \qquad (II)$$

The above test is suitably used to determine the WVTR of fabrics up to about 3000 g/m²/day. Desirably, for determining WVTRs in excess of 3000 g/m²/day other testing systems can be used such as, for example, the PERMATRAN-W 100K water vapor permeation analysis system, commercially available from Modern Controls, Inc. (MOCON) of Minneapolis, Minn.

Hydrohead: A measure of the liquid barrier properties of a fabric is the hydrohead test. The hydrohead test determines the height of water or amount of water pressure (in millibars) that the fabric will support before liquid passes therethrough. A fabric with a higher hydrohead reading indicates it has a greater barrier to liquid penetration than a fabric with a lower hydrohead. The hydrohead can be performed according to Federal Test Standard 191A, Method 5514. Hydrohead data can also be obtained using a test similar to the aforesaid Federal Test Standard except modified as noted below. The hydrohead can also be determined using a hydrostatic head tester available from Marl Enterprises, Inc. of Concord, N.C. The specimen is subjected to a standardized water pressure, increased at a constant rate until the first sign of leakage appears on the surface of the fabric in three separate areas. (Leakage at the edge, adjacent clamps is ignored.) Thin fabrics and/or materials, such as a thin film, are supported to prevent premature rupture of the specimen.

Peak Load: The Peak Load measures the peak or breaking loads of a fabric and measures the load in grams. In the peak load test, two clamps, each having two jaws with each jaw having a facing in contact with the sample, hold the material in the same plane, usually vertically, separated by 3 inches and move apart at a specified rate of extension. Values for peak load are obtained using a sample size of 3 inches by 6 inches, with a jaw facing size of 1 inch high by 3 inches wide, and a constant rate of extension of 300 mm/min. The Sintech 2 tester, available from the Sintech Corporation, 1001 Sheldon Dr., Cary, N.C. 27513, the Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Philadelphia., Pa. 19154 may be used for this test. Results are reported as an average of three specimens and may be performed with the specimen in the cross direction (CD) or the machine direction (MD).

EXAMPLES

A 60 g/m$^2$ precursor film comprising 60% by weight FILMLINK 2029 $CaCO_3$ from English China Clays, 23.5% Union Carbide unstabilized 6D82 (7 MFR propylene/ethylene copolymer containing about 5.5% ethylene), 12.5% Montell unstabilized X11395-49-1 (5 MFR Catalloy copolymer) and 4.0% Montell unstabilized X11395-49-2 (10 MFR Catalloy copolymer). To this precursor blend were added various primary and secondary stabilizers in varying amounts according to Table 1 set forth below. Primary stabilizers included were Ciba-Geigy IRGANOX 1076 or Ciba-Geigy IRGANOX E17. Secondary stabilizers included Ciba-Geigy IRGAFOS 168, DOVERPHOS S-9228, and/or hindered-amine light stabilizer CHIMASSOORB 119. All blend components including stabilizers were compounded prior to the film manufacturing step.

This compound had a 3.32 MFR (230° C.) and a density of 1.49 g/cm$^3$. The film was produced on a blown film line at 13 lb./inch/hr at a 414° F. melt temperature and which yielded a 1.5 mil product. The resulting filled film was wound up unstretched for transport to an off-line machine direction orientor (MDO). The film was stretched in the MDO in multiple stages between rollers heated to 185° F. and was then annealed at 210° F. The final stretch ratio was 3.4 times its original length and the final gage was approximately 0.5 mil. The output speed of the MDO was set at 600 feet per minute. The stretch-thinned film, now uniformly opaque was then passed to a thermal point bonder, run at 80% of the MDO exit speed, containing an engraved pattern roll and a crowned smooth anvil nipped together to form an integral laminate with a 17 g/m$^2$ thermally point bonded polypropylene spunbond web. The resulting laminate contained a plurality of uniformly spaced depressions created by the raised engravings of the pattern roll which is where the thermal bond was imparted. The bond pattern was "C-Star" pattern which produced about a 15% bond area.

For purposes of the present example, a "defect" is considered to be a hole having an area of 0.0027 square inches or greater. Level of defects can be assessed by comparing the square inches of open area (holes) per 100 square yards of stretched film and may be calculated visually or with an automated camera system. To aid the visual calculation a light source may be provided behind the film when analyzing the same. Defects in the stretched-filled films are significantly reduced when using IRGANOX E17 stabilizer. The IRGANOX 1076 likewise had a reduced defect level but had more defects than the stretched-filled films containing IRGANOX E17. Both the mono-functional hindered phenol stabilizers had significantly lower defects than unstabilized controls. Further, stretched-filled microporous films made with mono-functional hindered phenols likewise have increase toughness, such as a higher peak load, and a more uniform film gauge and/or basis weight. In this regard the variation in basis weight (grams per square meter) across the film is improved and, as shown above, a low standard deviation of the basis weight of individual sections of the film, relative to the average basis weight of the film, is achieved.

While various patents and other references have been incorporated herein by reference, to the extent there is any inconsistency between incorporated material and that of the written specification, the written specification shall control. In addition, while various ranges have been provided herein, such ranges are meant to include each and every sub-range therein. For example, a range of 100–1000 would thus also include 101–1000, 101–999, 101–998 etc. Further, while the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

We claim:

1. A stretched-thinned film comprising:
   from about 30 to 70% by weight thermoplastic polymer;
   from about 30 to 70% by weight filler having an average size less than about 10 microns; and
   from about 100 to 1500 PPM mono-functional hindered phenol wherein the stretched-filled film is a breathable barrier.

2. The stretched thinned-film of claim 1 wherein the mono-functional hindered phenol comprises a tocopherol.

3. The stretched thinned-film of claim 1 wherein the mono-functional hindered phenol comprises 2,5,7,8-tetramethyl-2-(4',8',12'-trimethyltridecyl)-6-chromanol.

4. The stretched thinned-film of claim 2 wherein the tocopherol is present within said film in an amount from about 100 to 1000 PPM.

TABLE 1

| Trial No. | IRGANOX E-17 | IRGANOX 1076 | CHIMASSORB 119 | IRGAFOS 168 | DOVERPHOS S-9228 | MD Peak Load (lbs) | Defects (square inches per 100 yds.) | Standard Deviation of Basis Weight |
|---|---|---|---|---|---|---|---|---|
| 93K | 1000 ppm | | | | 1000 ppm | 17.0 | 0.02467 | 0.0598 g |
| 93L | 1000 ppm | | 1000 ppm | | | 16.2 | 0 | 0.0095 g |
| 93J | 1000 ppm | | 1000 ppm | 1000 ppm | | 13.5 | 0.006 | 0.0328 g |
| 93M | 1000 ppm | | 1000 ppm | | 1000 ppm | 15.7 | 0 | 0.0325 g |
| 93I | | 1000 ppm | 1000 ppm | | | 15.4 | 0 | 0.030 g |
| 93G | | 1000 ppm | | 1000 ppm | | 15.5 | 0 | 0.0760 g |
| 93H | | 1000 ppm | 1000 ppm | | 1000 ppm | 15.9 | 0.004 | 0.0380 g |

5. The stretched-thinned film of claim 4 wherein said tocopherol is present within the film in an amount from about 100 to 600 PPM.

6. The stretched-thinned film of claim 4 wherein said thermoplastic polymer comprises a polyolefin and blends and copolymers thereof.

7. The stretched-thinned film of claim 4 wherein said thermoplastic polymer comprises a blend or copolymer selected from the group consisting of polyethylene and polypropylene.

8. The stretched-thinned film of claim 7 wherein said filler comprises calcium carbonate particles and further wherein said film has a basis weight less than about 35 $g/m^2$, a peak load in excess of 15 pounds and a WVTR in excess of about 300 $g/m^2/24$ hours.

9. The stretched-thinned film of claim 6 wherein said film has a basis weight less than about 35 $g/m^2$ and a WVTR in excess of about 300 $g/m^2/24$ hours.

* * * * *